United States Patent
Glugla et al.

(10) Patent No.: US 9,404,468 B2
(45) Date of Patent: Aug. 2, 2016

(54) METHOD AND SYSTEM FOR TORQUE CONTROL

(71) Applicant: Ford Global Technologies, LLC, Dearborn, MI (US)

(72) Inventors: Chris Paul Glugla, Macomb, MI (US); Ken Jahr, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 370 days.

(21) Appl. No.: 13/969,338

(22) Filed: Aug. 16, 2013

(65) Prior Publication Data
US 2015/0047607 A1    Feb. 19, 2015

(51) Int. Cl.
| | |
|---|---|
| *F02P 5/145* | (2006.01) |
| *F02P 5/04* | (2006.01) |
| *F02P 5/15* | (2006.01) |
| *F02D 37/02* | (2006.01) |
| *F02D 41/02* | (2006.01) |
| *F02P 5/152* | (2006.01) |
| *F02D 41/00* | (2006.01) |
| *F02N 11/00* | (2006.01) |
| *F02P 7/03* | (2006.01) |

(52) U.S. Cl.
CPC .............. *F02P 5/145* (2013.01); *F02D 37/02* (2013.01); *F02D 41/023* (2013.01); *F02P 5/045* (2013.01); *F02P 5/1504* (2013.01); *F02D 41/0072* (2013.01); *F02D 2200/021* (2013.01); *F02D 2200/101* (2013.01); *F02N 11/00* (2013.01); *F02P 5/1521* (2013.01); *F02P 7/035* (2013.01); *Y02T 10/46* (2013.01); *Y10S 903/902* (2013.01)

(58) Field of Classification Search
None
See application file for complete search history.

(56) References Cited

U.S. PATENT DOCUMENTS

| | | | | |
|---|---|---|---|---|
| 4,949,691 | A * | 8/1990 | Abe | F02D 41/1498 123/406.25 |
| 5,012,695 | A | 5/1991 | Kyohzuka et al. | |
| 5,157,991 | A * | 10/1992 | Sumimoto | F16H 59/72 477/133 |
| 5,875,761 | A * | 3/1999 | Fujieda | F01L 1/267 123/399 |
| 6,467,255 | B1 * | 10/2002 | Grob | F01N 3/0842 477/100 |
| 6,530,861 | B1 * | 3/2003 | Nakashima | B60W 10/06 477/105 |
| 6,770,009 | B2 | 8/2004 | Badillo et al. | |

(Continued)

FOREIGN PATENT DOCUMENTS

JP      2005090339 A * 4/2005

OTHER PUBLICATIONS

Gibson, Alex O'Connor et al., "Methods and Systems for a Driveline Disconnect Clutch," U.S. Appl. No. 13/776,347, filed Feb. 25, 2013, 176 pages.
Anonymous, "Braking Compensation of Excess Drive Torque," IPCOM No. 000156863, Published Aug. 7, 2007, 4 pages.

*Primary Examiner* — Hung Q Nguyen
*Assistant Examiner* — Brian P Monahon
(74) *Attorney, Agent, or Firm* — Julia Voutyras; Alleman Hall McCoy Russell & Tuttle LLP

(57) ABSTRACT

Methods and systems are provided for enabling a smooth transmission shift in a hybrid vehicle configured with a motor hybrid transmission. During an initial part of a transmission upshift, spark timing may be advanced from MBT to expedite torque reduction. Once engine speed has sufficiently reduced, and is within a threshold range of the desired engine speed, spark timing may be retarded until the transmission shift is completed.

18 Claims, 5 Drawing Sheets

(56) References Cited

U.S. PATENT DOCUMENTS

| | | | | |
|---|---|---|---|---|
| 7,207,923 B2* | 4/2007 | Kim | ............... | B60W 30/19 477/102 |
| 2002/0086771 A1* | 7/2002 | Abe | ............... | B60W 10/06 477/101 |
| 2003/0109357 A1* | 6/2003 | Tabata | ............... | B60K 6/442 477/109 |
| 2006/0293829 A1* | 12/2006 | Cornwell | ............... | F02D 35/023 701/114 |
| 2008/0064561 A1* | 3/2008 | Popp | ............... | B60K 6/48 477/5 |
| 2010/0108031 A1* | 5/2010 | Pursifull | ............... | F02P 5/1508 123/406.5 |
| 2010/0292048 A1* | 11/2010 | Oshima | ............... | B60W 10/06 477/109 |
| 2011/0004392 A1* | 1/2011 | Senda | ............... | F02P 5/1516 701/102 |

\* cited by examiner

METHOD AND SYSTEM FOR TORQUE CONTROL

FIELD

The present description relates to a system and methods for improving torque reduction control in the transmission of a hybrid vehicle

BACKGROUND AND SUMMARY

Some hybrid vehicles may include a motor hybrid transmission (MHT). Therein, a driveline disconnect clutch can mechanically and selectively isolate an engine from the transmission and vehicle wheels so that the transmission and wheels can operate independently from the engine. The driveline disconnect clutch allows torque to be provided to the driveline to propel the vehicle even if the engine has stopped rotating. In addition, the system may include an electric motor located between the flex-plate and the torque converter and can be used to supplement torque output as well as absorb and store power during vehicle deceleration.

Typically, engine powertrain control systems perform torque control during transmission shifting to help match engine speed for the next gear being commanded by the engine. One example approach for torque control is shown by Badillo et al. in U.S. Pat. No. 6,770,009. Therein, spark retard is used during a vehicle launch from rest to improve torque delivery between a clutch plate on the engine side and a clutch plate on the transmission side. The fast actuation of the spark retard reduces unstable torque control during the vehicle launch.

However the inventors herein have recognized that torque control in hybrid vehicles having motor hybrid transmissions may be complicated. This is due to the increased inertia weight of the rotating assembly of the engine and the armature of the hybrid motor combining to make significant inertial mass that may not be decelerated fast enough to match the transmission shift speed. As a result, there may be conditions where utilizing spark retard does not provide the desired smooth transition, resulting in recurring vehicle bucking and NVH issues. Specifically, during a transmission shift, closing the driveline disconnect clutch may induce a noticeable torque disturbance into the driveline if the driveline disconnect clutch transfers more torque than is desired due to a large speed difference between either sides of the clutch.

In one example, the above issue may be at least partly addressed by a method for a hybrid vehicle, comprising, during a transmission gear shift, reducing engine speed by operating one or more cylinders with spark timing advanced of MBT, and when engine speed is lower than a threshold, operating the one or more cylinders with spark timing retarded from MBT. In this way, enough negative torque can be produced to slow the engine for a smooth transmission shift.

As an example, during a transmission shift in a hybrid electric vehicle configured with a motor hybrid transmission, spark timing may be advanced from MBT in one or more engine cylinders to generate sufficient negative torque to slow engine speed. The amount of spark advance used may be selected so that a peak pressure of the cylinder occurs well before TDC so as to reduce cylinder knocking. Based on the amount of torque reduction needed, one or more cylinders (e.g., all cylinders) of the engine may have spark timing advanced. For example, over the given transmission shift, some cylinders may have spark timing advanced of MBT while other remaining cylinders have spark timing retarded of MBT, or at MBT. The use of spark advance allows the engine speed to be reduced to a threshold speed faster. Optionally, in engines configured with direct fuel injection, a stratified charge may be used along with the spark advance to improve combustion. The stratified charge may include, for example, injecting fuel near the time of spark. Once the engine speed is at or below the threshold speed, the use of spark advance during the transmission shift may be stopped. Instead, spark retard may be used in the one or more engine cylinders to reduce the propensity for knock during the shift. In addition, use of spark retard may be used after the transmission shift.

In this way, by advancing spark timing from MBT during a transmission shift in a hybrid vehicle, more negative torque can be produced earlier in an engine cycle. In particular, while spark retard from MBT reduces torque, spark advance well in advance of MBT can produce negative torque, as the piston has to do work against the pressure created by combusting very early. As such, this approach may generate more negative torque than may be produced using fuel shut-off to all engine cylinders, or a closed throttle deceleration. By increasing the amount of negative torque produced, engine speed can be rapidly slowed to match the engine speed required during the shift. Overall, a smoother transmission shift is enabled.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
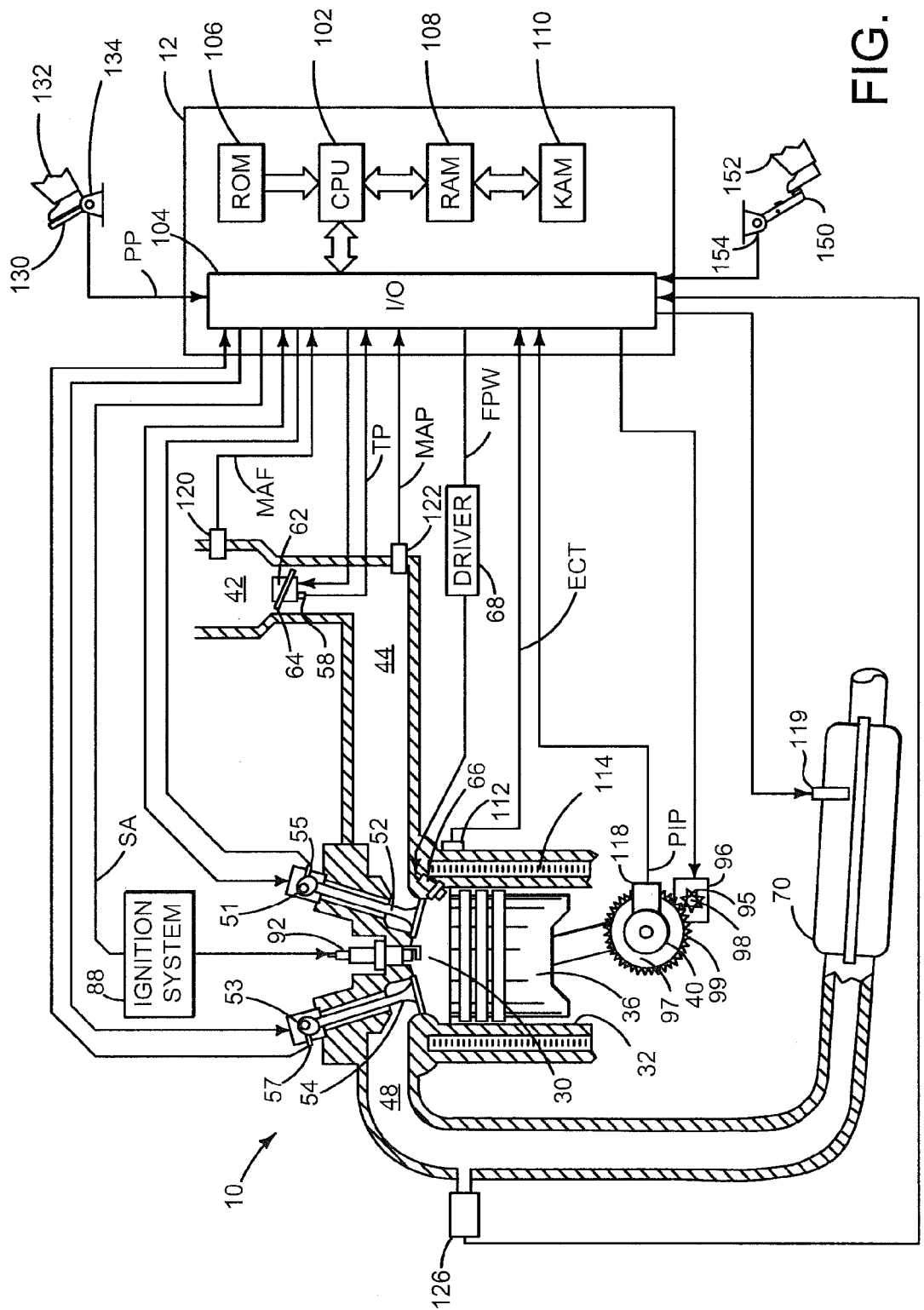
FIG. 1 is a schematic diagram of an engine.
Figure 2:
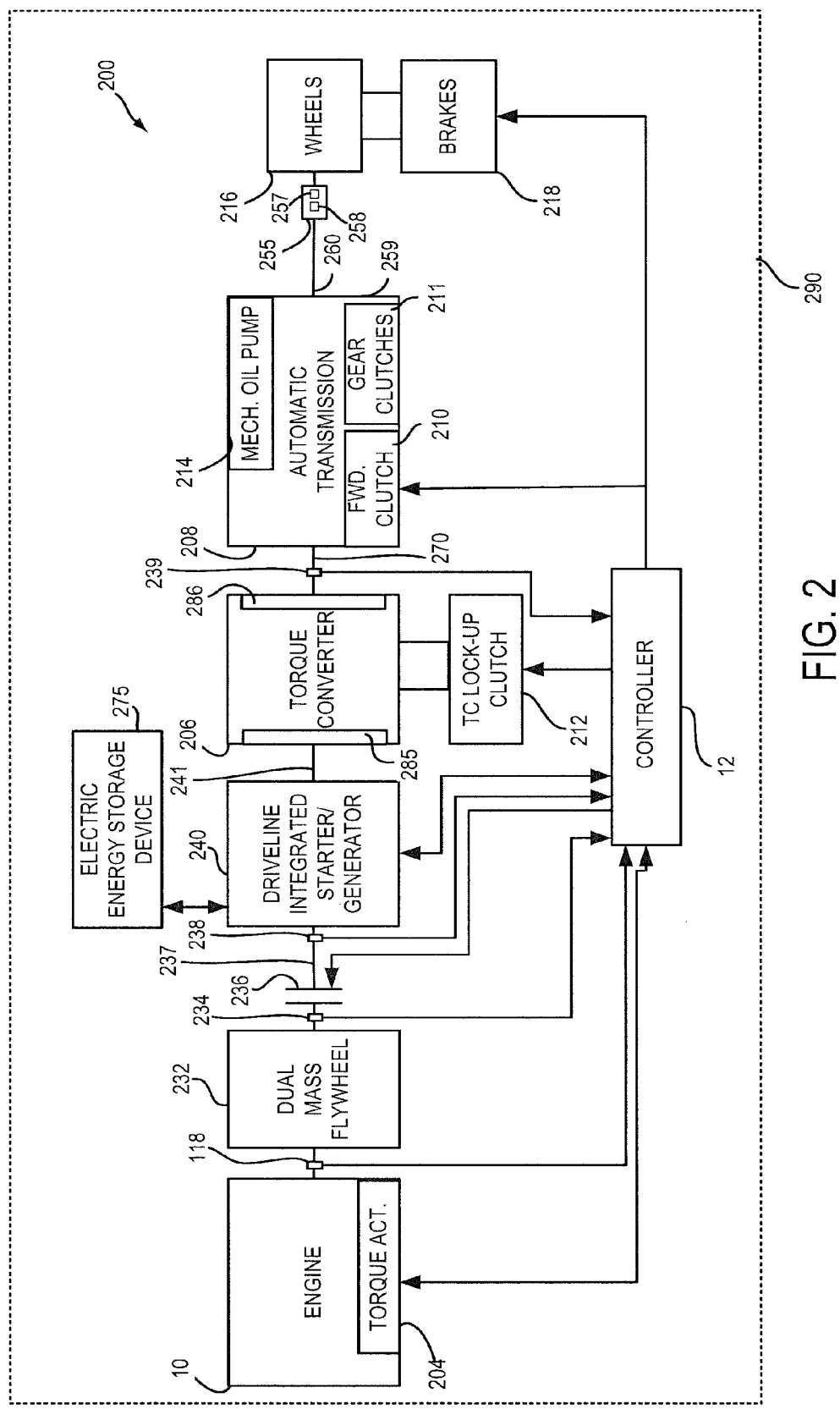
FIG. 2 shows an example embodiment of a vehicle driveline configuration.
Figure 4:
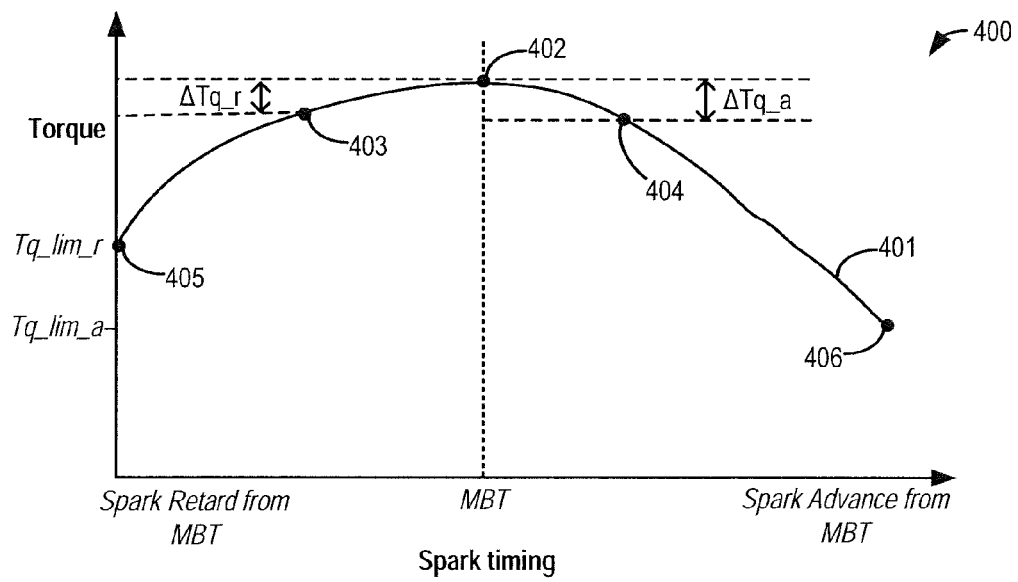
FIG. 4 is a map depicting change in average cylinder torque with change in spark timing.
Figure 5:
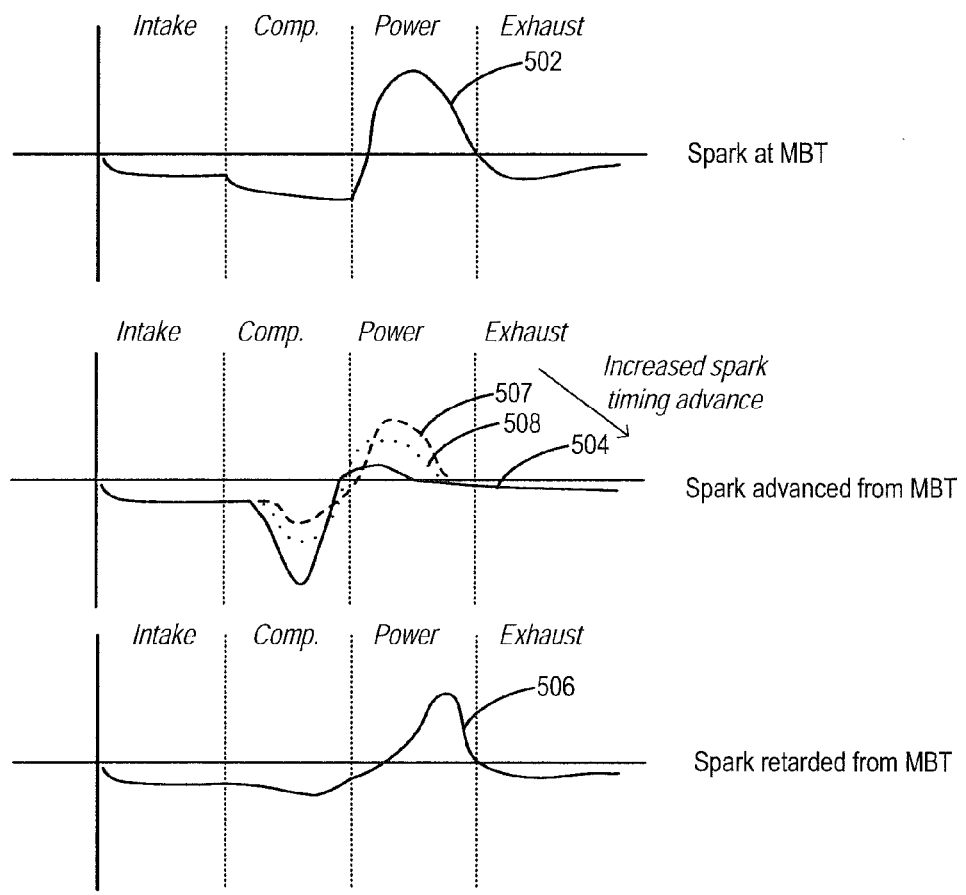
FIG. 5 shows maps depicting a change in instantaneous cylinder torque over an engine cycle with change in spark timing.

The present description is related to controlling a driveline of a hybrid vehicle including an engine and an electric motor coupled to a transmission via a clutch as shown in FIGS. 1-2. During a transmission gear shift, average torque reduction may be achieved by adjusting a spark timing (FIG. 5). An engine controller may be configured to perform a control routine, such as the routine of FIG. 4, to expedite torque reduction during a transmission gear shift by operating one or more engine cylinders with spark timing advanced from MBT. Then, once the engine speed has sufficiently reduced, the gear shift may be completed with spark timing in the cylinders retarded from MBT. By adjusting the spark advance, the amount and timing of negative torque generated during an engine cycle (FIG. 6) can be advantageously adjusted to counter the inertia of the motor hybrid transmission during the transmission shift. An example adjustment is shown with reference to FIG. 7.

Figure 3:
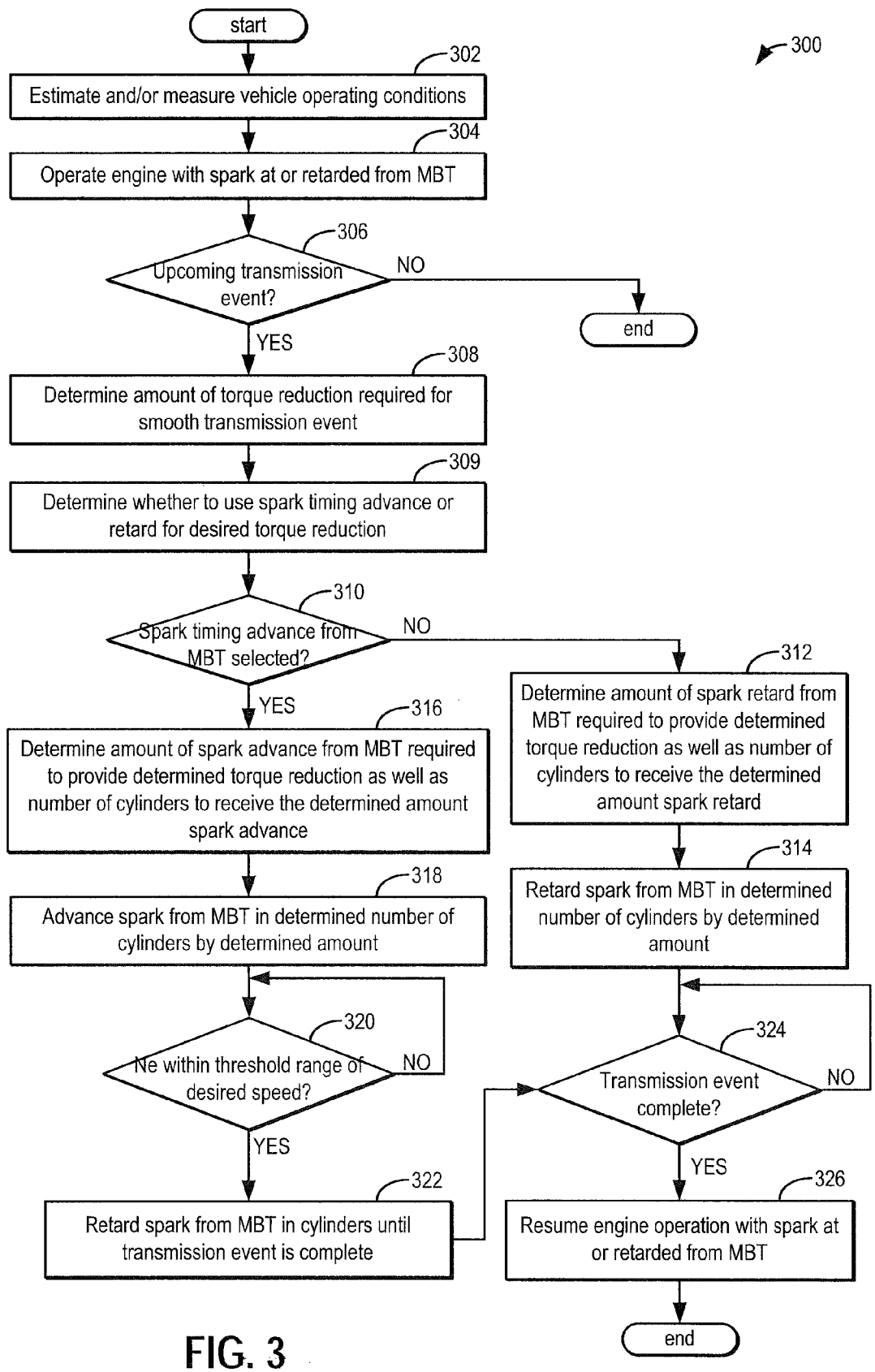
FIG. 3 is a flowchart illustrating the use of spark advance from MBT for torque reduction during a transmission shift.

FIGS. 1-3 depict the driveline of a hybrid vehicle including an engine and electric machine. The engine may be operated with or without a driveline integrated starter/generator (e.g., an electric machine or motor that may be abbreviated DISG) during vehicle operation. The driveline integrated starter/generator is integrated into the driveline on the same axis as the engine crankshaft and rotates whenever the torque converter impeller rotates. Further, the DISG may not be selectively engaged or disengaged with the driveline. Rather, the DISG is an integral part of the driveline. Further still, the DISG may be operated with or without operating the engine. The mass and inertia of the DISG remain with the driveline when the DISG is not operating to provide or absorb torque from the driveline.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. Starter 96 may be described as a lower power starting device. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst, a particulate filter, a lean NOx trap, selective reduction catalyst, or other emissions control device. An emissions device heater 119 may also be positioned in the exhaust system to heat converter 70 and/or exhaust gases.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force and/or position applied by foot 132; a position sensor 154 coupled to brake pedal 150 for sensing force and/or position applied by foot 152; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 in vehicle 290. Driveline 200 may be powered by engine 10. Engine 10 may be started with an engine starting system shown in FIG. 1 or via a driveline integrated starter-generator (DISG) 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of driveline disconnect clutch 236. Driveline disconnect clutch 236 may be electrically or hydraulically actuated. A position sensor 234 is positioned on the driveline disconnect clutch side of dual mass flywheel 232 to sense the output position and speed of the dual mass flywheel 232. In some examples, position sensor 234 may include a torque sensor. The downstream side of driveline disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a power output that is greater than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the driveline disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter impeller speed and position may be determined via sensor 238. Torque converter turbine speed and position may be determined via position sensor 239. In some examples, 238 and/or 239 may be torque sensors or may be combination position and torque sensors.

When torque converter clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter clutch 212 is fully engaged, the engine output torque is directly transferred via the torque converter clutch to an input shaft 270 of transmission 208. Alternatively, the torque converter clutch 212 may be partially engaged, thereby enabling the amount of torque directly relayed to the transmission to be adjusted. The controller 12 may be configured to adjust the amount of torque transmitted by torque converter 206 by adjusting the torque converter clutch 212 in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Output shaft 260 delivers torque from transmission 208 to wheels 216 via differential 255 which includes first gear 257 and second gear 258. Automatic transmission 208 may transfer an input driving torque at the input shaft 270 responsive to a vehicle traveling condition before transmitting an output driving torque to the wheels 216.

Further, a frictional force may be applied to wheels 216 by engaging wheel friction brakes 218. In one example, wheel friction brakes 218 may be engaged in response to the driver pressing his foot on a brake pedal (not shown). In other examples, controller 12 or a controller linked to controller 12 may engage wheel friction brakes. In the same way, a frictional force may be reduced to wheels 216 by disengaging wheel friction brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from DISG windings as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle frame. A transmission clutch pressure may be varied (e.g., increased) to adjust the engagement state of a transmission clutch, and provide a desired amount of transmission torsion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted. When restart conditions are satisfied, and/or a vehicle operator wants to launch the vehicle, controller 12 may reactivate the engine by resuming combustion in cylinders.

The systems of FIG. 1-2 may include torque sensors that may be the basis for adjusting driveline operation. Alternatively, the torque converter itself may be used as the torque sensor when the torque converter clutch 212 is fully disengaged. Specifically, the torque output of an open torque converter is a function of the input and output speeds, the impeller and turbine speeds where the impeller in the torque converter input and the turbine the torque converter output. In the operation of FIG. 2, the impeller speed is equal to the measured DISG speed, as the DISG rotor output shaft is the impeller input shaft and the turbine speed is measured and used in the control of the transmission clutch control.

Additionally, given an input and output speed characterization of the open torque converter, the torque output of the open torque converter can be controlled by controlling the torque converter impeller speed as a function of the torque converter turbine speed. The DISG may be operated in speed feedback mode to control torque converter torque. For example, the commanded DISG speed (e.g., same as torque converter impeller speed) is a function of the torque converter turbine speed. The commanded DISG speed may be determined as a function of both the DISG speed and the turbine speed to deliver the desired torque at the torque converter output.

The inventors herein have recognized that while the driveline configuration of FIG. 2 provides various advantages, due to the specific arrangement of driveline components in the hybrid vehicle of FIG. 2, the inertial mass of the driveline may be substantially increased. Specifically, the inertial mass of the rotating assembly of the engine combined with the inertial mass of the armature of the hybrid motor, the dual mass flywheel, and the disconnect clutch results in significant inertial mass. As such, this mass may complicate torque control, especially during a transmission shift when engine speed needs to be decelerated rapidly to match the transmission shift speed.

As elaborated with reference to FIG. 3, during a transmission gear shift, based on the amount of torque reduction required prior to engaging the requested gear, spark timing may be advanced of MBT in one or more engine cylinders to expedite torque reduction. Once the engine speed is below a threshold speed, or within a threshold speed of the speed required for engaging the desired gear, spark timing may be retarded from MBT in one or more cylinders of the engine to allow for more accurate speed control. By using spark advance, a larger amount of negative torque can be generated earlier in an engine cycle of a cylinder, allowing for a faster drop in engine speed. Also during transmission the gear shift, a timing of opening and closing the torque converter clutch can be coordinated with a timing of releasing an off-going gear clutch and applying an on-going gear clutch, while the disconnect clutch is kept closed, so as to reduce driveline torque disturbances. In this way, transmission shifts can be performed smoothly, even in transmission embodiments having higher inertial mass.

It will be appreciated that while the use of spark well advanced of MBT for generation of negative torque is explained herein in the context of a motor hybrid transmission, the same spark timing adjustment may be used with other transmission configurations to generate higher negative torque during a compression phase. Specifically, the generation of extra negative torque is shown herein to expedite the drop in engine speed during a transmission shift in a hybrid vehicle having a motor hybrid transmission, but can be similarly used in other engine configurations during conditions when more negative torque is needed.

Now turning to FIG. 3, an example routine 300 is shown for adjusting spark timing during a transmission shift in a hybrid vehicle having a motor hybrid transmission with a clutch configured to mechanically and selectively isolate each of an engine and an electric motor of the hybrid vehicle from the transmission, such as in the vehicle drivelines of FIGS. 1-2. The routine determines an amount of spark timing advance and/or retard to be used during the transmission shift based on engine operating conditions, thereby allowing for a smooth transmission shift.

At 302, vehicle and engine operating conditions may be estimated and/or measured. These may include, for example, engine speed, battery state of charge, MAP, BP, engine temperature, ambient conditions including ambient temperature, pressure, and humidity, boost level, EGR rate and amount, etc.

At 304, the engine may be operated with spark timing at MBT or retarded from MBT. For example, spark retard may be used during cold start conditions so as to expedite exhaust catalyst warming. Then, when the catalyst is sufficiently warm, spark timing may be returned to MBT to improve fuel economy. As another example, during engine hot start conditions, spark timing may be maintained at MBT.

At 306, it may be determined if there is an upcoming transmission event. Specifically, it may be determined if a transmission gear upshift from a lower gear (for example, a transmission first gear) to a higher gear (for example, a transmission third gear) is required. If a transmission shift is not confirmed, no further spark timing adjustments may be required. As such, during a transmission upshift, engine speed may need to be reduced, and therefore a torque reduction may be required as off-going clutch is released and before the on-going clutch is applied. During a transmission downshift, torque reduction may not be required (or may be required by a smaller amount, such as towards the end of the shift). If a transmission event is not expected, engine operation with the current spark timing may be continued and the routine may end.

If a transmission shift event is confirmed, at 308, the routine includes determining the amount of torque reduction required for the transmission event. The amount of torque reduction required may be based at least on the engine speed at the time the transmission event was requested and the engine speed required at the time of the transmission shift. In addition, the torque reduction required may be based on a difference between the off-going gear and the on-going gear (or gear ratio difference). For example, the torque reduction required when upshifting from a transmission $1^{st}$ gear to a transmission $2^{nd}$ gear may be different (e.g., smaller) than the torque reduction required when upshifting from the transmission $1^{st}$ gear to a transmission $3^{rd}$ gear.

At 309, based on the amount of torque reduction required and further based on engine operating conditions such as EGR rate, engine temperature, and pedal position, it may be determined whether to provide the required torque reduction via spark timing advance from MBT or spark timing retard from MBT. This is because at low speeds, the mechanical friction is higher, so the controller may not need to create as much negative torque. For example, if the engine temperature is higher and knock is more likely, spark retard may be used for the requisite torque reduction since spark retard also mitigates the knocking. In comparison when the engine temperature is lower, spark advance from MBT may be used since knocking is less likely. As another example, when the transmission gear shift includes a higher difference between the engine speed at which the transmission gear shift was requested and the engine speed at which the gear shift is required, spark advance may be used to enable a faster torque reduction, while spark retard may be used when the difference is lower. As further elaborated herein, spark advance may be used for at least an initial portion of the transmission gear shift so as to expedite engine speed reduction.

It will be appreciated that the controller may make sure spark timing is well advanced of MBT timing. As such, if spark advance is too close to MBT, high pressures may be created that could lead to severe knock, potentially damaging the engine.

As such, both spark timing advance from MBT and retard from MBT reduce torque output. Map 4 of FIG. 4 shows an example relationship between average torque output by an engine cylinder as spark timing varies. For a given air flow rate, fuel delivery rate, and engine speed, the relationship between engine torque and spark timing is shown as curve 401. At spark timing 402, known as minimum spark advance for best torque (MBT), the highest engine torque is provided for the given operating condition. If spark timing is either advanced or retarded from MBT, engine torque reduces. Since fuel efficiency (not plotted in FIG. 4) is at a maximum at MBT, for fuel efficiency reasons, it may be desirable to operate the engine at MBT spark timing for most engine operating conditions.

During conditions when torque reduction is rapidly required, such as during a transmission gear shift (specifically an upshift), spark timing can be advanced or retarded from MBT to provide the desired torque reduction. Since the slope of curve 401 is different on either side of spark timing 402 (MBT), a given torque reduction may be provided by a differing amount of spark retard from MBT relative to spark advance from MBT. Specifically, due to the steeper slope of curve 401 on the right side of spark timing 402 (in the direction of spark advance from MBT) relative to the shallower slope of the left side of spark timing 402 (in the direction of spark retard from MBT), a relatively smaller amount of spark advance may provide the same torque reduction as a relatively larger amount of spark retard. Put another way, for a given amount of spark retard from MBT (at spark timing 403 on the spark retard side of MBT), a smaller torque reduction is achieved (depicted here as ΔTq_r) while for the same amount of spark advance from MBT (at spark timing 404 on the spark advance side of MBT), a larger torque reduction is achieved (depicted here as ΔTq_a). In addition, the torque limits of spark timing retard and advance may vary. As shown at plot 401, spark retard from MBT can be used until a timing 405 and torque can be reduced until a torque Tq_lim_r, after which combustion stability is degraded and no further spark retard can be used. In comparison, spark advance from MBT can be used until a timing 406 and torque can be reduced until a lower torque Tq_lim_a, after which the engine may becomes knock limited and no further spark advance can be used. In other words, use of spark advance may allow for an overall larger amount of torque reduction. However, torque reduction via spark retard from MBT may still be preferred over spark advance from MBT due to exhaust emission reasons.

The inventors herein have recognized that during a transmission upshift, when a rapid drop in engine speed is required, spark timing advance from MBT can be advantageously used for at least an initial portion of the transmission shift to provide expedited torque reduction, particularly in engine configurations having higher inertial mass. For example, spark timing may be advanced in one or more engine cylinders while an off-going clutch is released at least until the engine speed is within a threshold distance of the engine speed at which the on-going clutch is to be applied. This allows for a faster, albeit more coarse, torque/engine speed control. Then, when the engine speed is within the threshold distance of the desired engine speed, spark timing retard from MBT can be used (e.g., towards the end of the transmission shift) to allow for a slower albeit more fine torque/engine speed control. The combined used of spark advance from MBT for the initial part of the transmission upshift and spark retard from MBT for the later part of the transmission upshift may allow for an overall faster engine speed reduction and smoother transmission shift while reducing an overall amount of spark timing adjustment (that is, spark timing advance or retard alone) required, and without degrading exhaust emissions.

In some embodiments, the engine controller may refer a map, such as the map of FIG. 4 to determine whether to use spark timing retard or spark timing advance from MBT to provide the required amount of torque reduction. At 310, it may be determined if use of spark timing advance from MBT was selected. If spark timing advance was not selected, then at 312, an amount of spark retard required to provide the desired torque reduction during the upcoming transmission shift may be determined. In addition, the controller may determine a number of engine cylinders to receive spark retard. In one example, all the engine cylinders may have spark timing retarded from MBT until the transmission shift is completed. In an alternate example, only a fraction of the engine cylinders may have spark timing retarded from MBT until the transmission shift is completed. The amount of spark retard required as well as the selection of engine cylinders for receiving the spark retard may be based on engine conditions such as one or more of engine speed and torque demand (as based on pedal position). In addition, the engine controller may refer a map, such as the map of FIG. 4 to determine the amount of spark retard required for the desired amount of torque reduction.

At 314, spark timing may be retarded by the determined amount in the selected cylinders. Spark timing may be retarded while an off-going gear clutch is released. Then, when the engine speed is within a threshold range of the desired engine speed, the on-going gear clutch may be applied, while maintaining the spark timing retard. As such, during the spark timing retard and while the on-going and off-going gear clutches are applied or released, the disconnect clutch between the engine and transmission may be maintained engaged.

At 324, it may be determined if the transmission shift is complete. For example, it may be confirmed that the engine speed has reached the desired speed, the off-going gear clutch has been released and the on-going gear clutch has been applied. If the transmission event is not complete, spark timing may remain modified at a timing retarded from MBT. At 326, when the transmission shift is completed, spark timing may be readjusted based on the current operating conditions.

As such, this may include resuming operating the engine with spark timing at or retarded from MBT, as at 304.

If use of spark timing advance is selected at 310, then at 316, the routine includes determining the amount of spark advance required to provide the determined torque reduction. In addition, the controller may determine a number of engine cylinders to receive spark advance from MBT. In one example, all the engine cylinders may have spark timing advanced from MBT until the transmission shift is completed. In an alternate example, only a fraction of the engine cylinders may have spark timing advanced of MBT may be based on an engine speed reduction required for the transmission gear shift, the number of cylinders increased as the engine speed reduction required increased. The engine speed reduction may be based on a difference between an engine speed at a time of transmission gear shift request and an engine speed required at a time of the transmission gear shift. As such, this may be based on the degree of gear shift (e.g., based on whether the gear shift includes an upshift by one gear, or more than one gear). The number of cylinders operated with spark advanced of MBT may be further based on engine temperature, the number increased as the temperature decreases. Specifically, due to the higher propensity for knocking at elevated engine temperatures, the amount of spark advance and the number of cylinders may be reduced as the likelihood of knock increases. In some embodiments, this effect may be lumped in with a mechanical friction estimate in an inferred torque model.

The amount of spark advance required as well as the selection of engine cylinders for receiving the spark advance may also be based on engine conditions such as one or more of engine speed, EGR rate, torque demand (as based on pedal position), and a change in transmission gear ratio. For example, as the EGR rate increases, spark timing advance from MBT may be decreased. As such, more spark advance is usually required to maintain MBT in the presence of EGR. However, the EGR may help negate knock so it is possible in the presence of EGR, spark may not need to be advanced as much to produce negative torque, and may be able to produce more negative torque than without EGR since it should help reduce knocking tendency.

As elaborated with reference to FIG. 5, by advancing the spark timing relative to MBT, an amount of negative torque instantaneously generated during a given engine cycle of a cylinder, as well as a timing of the negative torque generation can be varied. In particular, the use of spark advance enables a larger amount of negative torque to be generated earlier during a compression stroke of the cylinder due to the piston having to do work against the pressure created by combusting very early. The availability of more negative torque earlier in an engine cycle expedites reduction of engine speed which is particularly advantageous in engine systems having high inertial mass, such as in the hybrid vehicle system of FIGS. 1-2.

FIG. 5 compares torque generation over an engine cycle, in a stroke-wise manner, when spark timing is at MBT (plot 502), relative to when spark timing is advanced from MBT (plot 504) and when spark timing is retarded from MBT (plot 506).

Spark retard or advance from MBT reduces positive torque. MBT spark produces cylinder pressures that take advantage of the largest portion or pressure release acting on the best mechanical arrangement of the crankshaft, connecting rod, and piston assembly to extract the most work. Any advance or retard near MBT just reduces the torque. Extreme spark advance produces negative torque because it actually tries to push the piston the other direction, but cannot due to inertia force. Spark advanced of MBT slightly produces some early work, but it is too early to take advantage of mechanical advantage of the crank arrangement. That is, it still produces rotation of the crank in the direction intended (but just not enough). A very large amount of spark advanced of MBT actually tries to send the crankshaft the opposite direction, creating negative torque. In this arrangement the piston has to do more work to compress the combusted gas than comes out in the expansion stroke. The inventors herein have recognized that spark well advance of MBT can be advantageously used during selected engine conditions to generate excess torque which can be used to expedite engine speed, such as during a transmission gear shift.

When spark timing is at MBT, most of the negative torque produced in an engine cycle occurs over a compression stroke while a majority of the positive torque is produced in the middle of the power stroke (plot 502). As you move from borderline spark towards MBT, more positive torque is generated in the power stroke. Subsequently, advancing spark from MBT results in less positive torque being generated in the power stroke and more negative torque being generated in the compression stroke due to more work being done by the piston against the combusted gases in the compression stroke. In other words, more work is expended on the combusted gases during the compression stroke and less work is extracted from the combusted gases in the power stroke.

As can be seen by comparing plot 504 (solid line) with plots 507 and 508 (dashed line and dotted line respectively), as the spark timing is advanced further from MBT (plot 507 having the least amount of spark advance, plot 508 having more spark advance than plot 507, and plot 504 having more spark advance than either plots 507 and 508), the slope of the negative torque and positive torque, the absolute value of the peak negative and peak positive torque, as well as the timing of the peak positive and peak negative torque can be varied. Specifically, more negative torque can be produced in the compression stroke while less positive torque is produced in the power phase. While the average torque produced over the engine cycle remains the same in plots 504, 507, and 508, the varied timing and value of the peak negative torque varies the engine speed at which the negative torque is produced. By advancing the generation of peak negative torque to be earlier in the compression stroke, while also increasing the absolute amount of the peak negative torque generated in the compression stroke, the negative torque can improve the deceleration of the high inertial mass of the motor hybrid transmission, especially at higher engine speeds where the inertial mass may also be higher.

In comparison, when spark timing is retarded from MBT (plot 606), a smaller amount of negative torque is generated during the compression stroke (relative to timing at MBT or advanced from MBT) and also a proportionately larger amount of positive torque is produced during the power stroke.

Returning to FIG. 3, at 318, spark timing may be advanced by the determined amount in the selected cylinders. Specifically, during the transmission gear shift, engine speed is reduced by operating the one or more engine cylinders with spark timing advanced of MBT. In particular, spark timing may be advanced from MBT for at least an initial part of the transmission gear shift. The spark timing may be advanced while an off-going clutch is released. In addition, while the spark timing is advanced, the disconnect clutch between the engine and transmission may be maintained engaged.

As such, while operating the one or more cylinders with spark timing advanced of MBT, stratified cylinder combustion may be used. The stratified cylinder combustion may include injecting fuel into the cylinder at a time of spark. In other words, a timing of cylinder fuel injection may be adjusted based on the advanced spark timing so as to coordinate the cylinder fueling with the modified spark event timing.

At 320, it may be determined if the engine speed is within a threshold of the desired engine speed. As such, the desired engine speed is the engine speed at which the transmission shift occurs. If not, spark timing may be maintained advanced of MBT at 322 in the selected cylinders until sufficient engine speed reduction has been achieved.

If the engine speed is reduced to within the threshold range of the desired engine speed, or if the engine speed is lower than a threshold speed, then at 322, the controller may operate the one or more cylinders of the engine with spark timing retarded from MBT until the transmission event is completed. An amount of spark retard to be used may be determined based on engine operating conditions including one or more of engine speed, and torque demand (or pedal position). Herein, the shift to usage of spark retard from MBT may allow for further refined torque reduction to the desired engine speed, while also mitigating any potential knock. In other words, spark timing advance from MBT is used in the initial part of the transmission shift to reduce engine speed to a first, higher level at a first, faster rate, and then during the later part of the transmission shift, spark timing retard from MBT is used to reduce engine speed to a second, lower level at a second, slower rate, Also at 322, while spark timing is retarded, an off-going gear clutch may be completely released. When the engine speed is within a threshold range of the desired engine speed, the on-going gear clutch may be applied. As such, during the spark timing retard and while the on-going and off-going gear clutches are applied or released, the disconnect clutch between the engine and transmission may be maintained engaged.

At 324, it may be determined if the transmission shift is complete. For example, it may be confirmed that the engine speed has reached the desired speed, the off-going gear clutch has been released and the on-going gear clutch has been applied. If the transmission event is not complete, spark timing may remain modified at a timing retarded from MBT. At 326, when the transmission shift is completed, spark timing may be readjusted based on the current operating conditions. As such, this may include resuming operating the engine with spark timing at or retarded from MBT, as at 304.

It will be appreciated that while the routine of FIG. 3 depicts one or more cylinders operating advanced of MBT during an initial part of a transmission upshift to expedite engine speed reduction, and then transitioning to usage of spark timing retard from MBT during a later part of the transmission upshift, in alternate examples, one or more cylinders may be operated with spark timing advanced of MBT while one or more of the remaining cylinders are operated with spark timing retarded from MBT during the entire duration of the transmission shift event. The split ratio of an amount of spark timing advance and a number of cylinders operated with spark timing advance relative to the amount of spark timing retard and a number of cylinders operated with spark timing retard may be adjusted based on one or more of the engine speed, rotating inertia of the system, and the desired deceleration rate of the rotating system desired.

It will also be appreciated that while the routine of FIG. 3 depicts changes in cylinder spark timing for expedited torque reduction during a transmission upshift event, in other examples, spark timing advance may be used for at least a portion of a transmission downshift event, such as towards the end of a transmission downshift for improved engine speed and torque control. Alternatively, spark timing advance from MBT may be used in one or more engine cylinders during a transmission upshift while spark timing retard from MBT may be used in one or more engine cylinders during a transmission downshift.

In this way, torque reduction can be expedited in a hybrid vehicle system. The negative torque produced via use of spark timing advance from MBT may be substantially more than available via alternate approaches. For example, fuel may be shut-off to all engine cylinders during the transmission event, but this would result in zero torque and not enough negative torque to decelerate the engine and motor in the motor hybrid transmission fast enough. As another example, the intake throttle may be closed to increase the pumping friction. However, the negative torque applied from closed throttle deceleration may not be sufficient to slow the engine fast enough (a typical transmission shift time is less than 0.5 seconds) to match the engine speed during the shift. Absorption of power by the electric motor may also be inadequate to produce the desired dynamics in the desired timeframe. Thus, by using spark timing advance over at least an initial part of a transmission shift event, a larger amount of negative torque can be applied on the engine when it is at a higher engine speed, allowing for a greater rate of initial torque reduction.

For example, during a first transmission gear shift of a hybrid vehicle transmission system, engine speed may be reduced by operating a first number of cylinders with spark timing advanced of MBT. In comparison, during a second transmission gear shift of the hybrid vehicle transmission system, engine speed may be reduced by operating a second number of cylinders with spark timing retarded from MBT. The first number of cylinders operated with spark timing advance from MBT may be smaller than the second number of cylinders operated with spark timing retard from MBT, depending on inertia, engine speed, and desired deceleration rate. For example, at larger gear ratio spans which require higher deceleration rates. Herein, the first transmission gear shift includes a higher difference between engine speed at which transmission gear shift was requested and engine speed at which gear shift is required, while the second first transmission gear shift includes a smaller difference between engine speed at which transmission gear shift was requested and engine speed at which gear shift is required. For example, the first gear shift may include a 1-2 shift while the second gear shift may include a 2-3 or 1-3 shift, where the gear ratio between the 1-2 shift is larger than the 2-3 or 1-3 shift. The first transmission gear shift may occur at a lower engine temperature while the second transmission gear shift occurs at a higher engine temperature. The first transmission gear shift includes a higher change in transmission gear ratio and wherein the second transmission gear shift includes a smaller change in transmission gear ratio. Further, during the first transmission gear shift, the cylinders are operated with stratified fuel spark-initiated combustion while during the second transmission gear shift, the cylinders are operated with homogeneous fuel spark-initiated combustion. Further still, after the first transmission gear shift, the first number of cylinders may be operated with spark timing retarded from MBT, while after the second transmission gear shift, the controller may maintain operation of the second number of cylinders with spark timing retarded from MBT.

In another example, a method for a hybrid vehicle comprises, providing spark to a cylinder at or retarded from MBT spark timing before a transmission gear shift, the transmission coupled to each of an engine and a motor via a clutch, and transitioning providing spark to the engine at timing advanced of MBT timing during the transmission gear shift. An amount of spark advance used during the transmission gear shift may be based on one or more of EGR rate, engine speed, and torque demand. The method further comprises resuming providing spark to the engine at timing at or retarded from MBT after the transmission gear shift.

Figure 6:
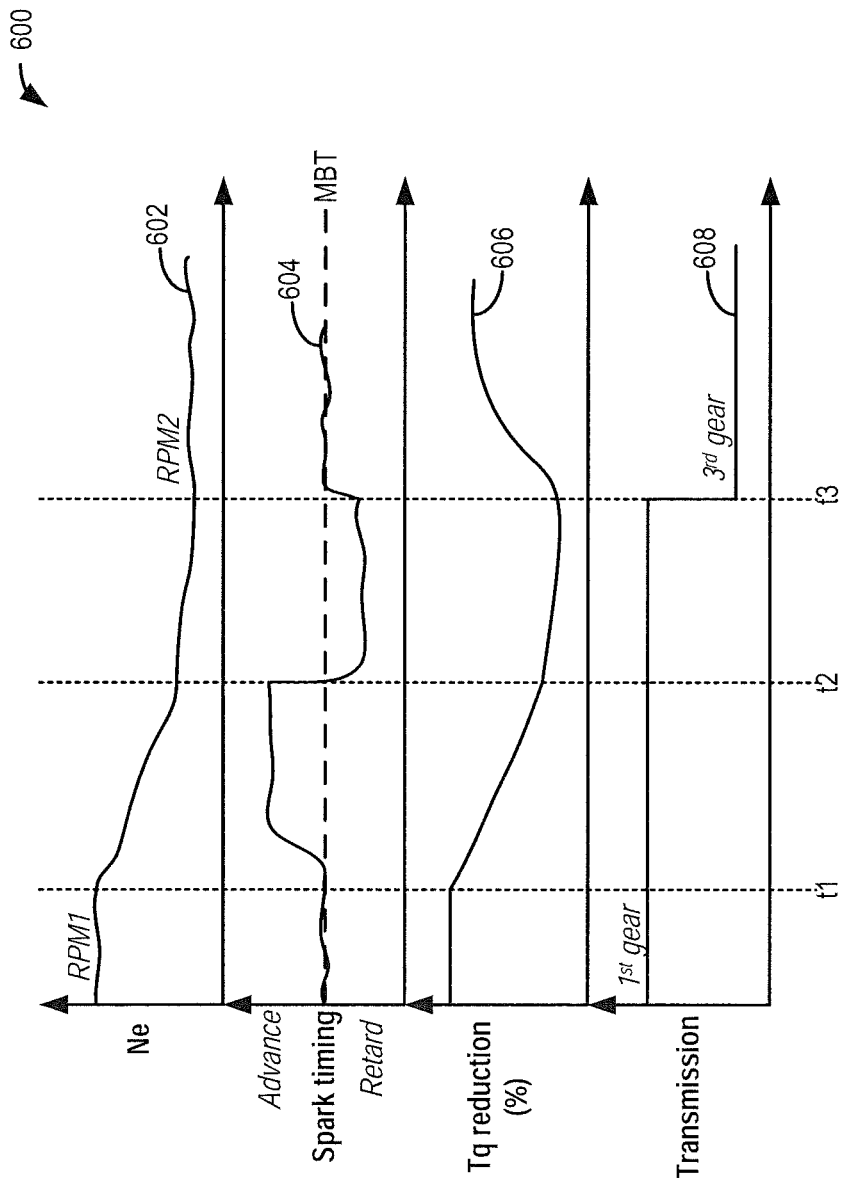
FIG. 6 shows an example use of spark advance for expedited torque reduction in a hybrid vehicle during transmission shifting.

Now turning to FIG. 6, an example spark timing adjustment during a transmission upshift is shown. Map 600 depicts engine speed (Ne) at plot 602, spark timing relative to MBT at plot 604, reduction in torque (relative to demanded torque as a percentage) at plot 606, and change in transmission gear at plot 608. All graphs are plotted over time of hybrid vehicle operation along the x-axis. As such, the engine and the transmission may be coupled in a hybrid vehicle and the transmission may be configured as a hybrid motor transmission wherein the engine and the motor are coupled in series along the driveline to the transmission via a disconnect clutch. The series configuration of the engine and the motor can add substantial inertial mass to the driveline, rendering torque reduction during a transmission event difficult. As elaborated herein, by using spark timing advance from MBT, torque reduction can be expedited and a smoother transmission shift can be enabled.

Prior to t1, the vehicle may be operating with the transmission in a first gear ($1^{st}$ gear, plot 608), and with the engine speed at a higher level (RPM1, plot 602) corresponding to the first gear. In addition, spark timing may be set to be at MBT (plot 604) for torque, fuel economy, and emissions purposes. During this time, the torque level may be at 100% (to match the torque demand) since no torque reduction is required.

At t1, a transmission shift from the $1^{st}$ gear to a transmission $3^{rd}$ gear may be requested. As such, for the transmission shift to be completed and a $3^{rd}$ gear clutch to be applied, engine speed may need to be reduced from the current level (RPM1) to a desired level (RPM2). To expedite engine speed reduction and enable a faster and smoother transmission shift, at t1, one or more cylinders of the engine (herein all) may have spark timing transitioned to provide spark to the engine at timing advanced of MBT timing during at least an initial part the transmission gear shift (between t1 and t2). An amount of spark advance used between t1 and t2 may be based on one or more of EGR rate, engine speed, and torque demand. By using spark timing advance from MBT, between t1 and t2, a rapid and substantial torque reduction is achieved (with a steeper slope). At t2, the engine speed may be within a threshold range of the desired engine speed RPM2. Thus, at t2, spark timing may be transitioned to provide spark to the engine at timing retarded from MBT timing during the later part the transmission gear shift (between t2 and t3). An amount of spark retard used between t2 and t3 and may be based on one or more of engine speed and torque demand. By using spark timing retard from MBT, between t2 and t3, a smaller torque reduction is achieved (with a shallower slope) while allowing for a more refined control of the engine speed to the desired engine speed.

At t3, the engine speed may be at the desired engine speed and the transmission shift may be completed. Specifically, release of the off-going gear clutch may be completed while the on-going gear clutch is completely engaged. As such, over the duration of the transmission shift, the clutch coupling the engine and the motor to the transmission may be kept engaged.

Following t3, the engine may be operated with the transmission in the $3^{rd}$ gear, plot 608), and with the engine speed at the lower level (RPM2) corresponding to the third gear. In addition, a controller may resume providing spark to the engine at MBT after the transmission gear shift has been completed. By returning the spark timing to MBT, torque reduction may be stopped and the available torque may resume being 100% of the demanded torque.

In this way, spark timing advance from MBT can be used during at least an initial portion of a transmission upshift to expedite torque reduction in hybrid vehicle engine systems having high inertial mass. By varying the amount of spark advance from MBT used, more negative torque can be produced earlier in an engine cycle. As such, this improves the rate of deceleration in engines coupled to a motor hybrid transmission, allowing for the engine speed reduction to occur within the available time frame. In addition, a smoother transmission shift may be enabled improving overall hybrid vehicle performance.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method for a hybrid vehicle, comprising:
during a transmission gear shift:
reducing engine speed by operating one or more cylinders with spark timing advanced of MBT, where an actual total number of cylinders operated with spark timing advanced of MBT is based on an engine speed reduction required for the transmission gear shift, the actual total number increased as the engine speed reduction required increases; and when engine speed is lower than a threshold, operating the one or more cylinders with spark timing retarded from MBT.

2. The method of claim 1, wherein the engine speed reduction required is based on a difference between an engine speed at a time of transmission gear shift request and an engine speed required at a time of the transmission gear shift.

3. The method of claim 1, wherein the actual total number of cylinders operated with spark timing advanced of MBT is further based on engine temperature, the number increased as engine temperature increases.

4. The method of claim 1, further comprising, while operating the one or more cylinders with spark timing advanced of MBT, using stratified cylinder combustion.

5. The method of claim 4, wherein the stratified cylinder combustion includes injecting fuel at a time of spark.

6. The method of claim 1, wherein the transmission is a motor hybrid transmission having a clutch configured to mechanically and selectively isolate each of an engine and an electric motor of the hybrid vehicle from the transmission.

7. The method of claim 1, wherein an amount of spark advance is based on one or more of EGR rate, engine speed, torque demand, change in transmission gear ratio, rotating inertia of rotating pieces, and deceleration, the amount of spark advance increased as the EGR rate increases.

8. The method of claim 1, wherein an amount of spark retard is based on one or more of engine speed and torque demand.

9. The method of claim 1, further comprising, maintaining spark timing retarded from MBT after the transmission gear shift.

10. A method, comprising:
during a first transmission gear shift of a hybrid vehicle transmission system, reducing engine speed by operating a first number of cylinders with spark timing advanced of MBT; and
during a second transmission gear shift of the hybrid vehicle transmission system, reducing engine speed by operating a second number of cylinders with spark timing retarded from MBT, where the first number is larger than the second number.

11. The method of claim 10, wherein the first transmission gear shift includes a first difference between engine speed at which transmission gear shift was requested and engine speed at which gear shift is required, and wherein the second transmission gear shift includes a second difference between engine speed at which transmission gear shift was requested and engine speed at which gear shift is required, the first difference greater than the second difference.

12. The method of claim 10, wherein the first transmission gear shift occurs at a first engine temperature and wherein the second transmission gear shift occurs at a second engine temperature, the second engine temperature greater than the first engine temperature.

13. The method of claim 10, wherein the first transmission gear shift includes a higher change in transmission gear ratio and wherein the second transmission gear shift includes a smaller change in transmission gear ratio.

14. The method of claim 10, further comprising, during the first transmission gear shift, operating the cylinders with stratified fuel spark-initiated combustion and during the second transmission gear shift, operating the cylinders with homogeneous fuel spark-initiated combustion.

15. The method of claim 10, further comprising, after the first transmission gear shift, operating the first number of cylinders with spark timing retarded from MBT, and after the second transmission gear shift, maintaining operation of the second number of cylinders with spark timing retarded from MBT.

16. A method for a hybrid vehicle, comprising:
providing spark to a cylinder at or retarded from MBT spark timing before a transmission gear shift, a transmission coupled to each of an engine and a motor via a clutch;
transitioning providing spark to the engine at a timing advanced of MBT timing during the transmission gear shift; and
transitioning providing spark to the engine at the timing advanced of MBT timing to a timing retarded of MBT timing in response to engine speed being within a threshold speed of a desired speed during the transmission gear shift.

17. The method of claim 16, wherein an amount of spark advance used during the transmission gear shift is based on one or more of EGR rate, engine speed, torque demand, rotating inertia, and gear ratios.

18. The method of claim 17, further comprising resuming providing spark to the engine at the timing at or retarded from MBT after the transmission gear shift.

* * * * *